Jan. 8, 1946. W. M. LARSON 2,392,676
DISPENSING APPLIANCE
Filed Dec. 11, 1944
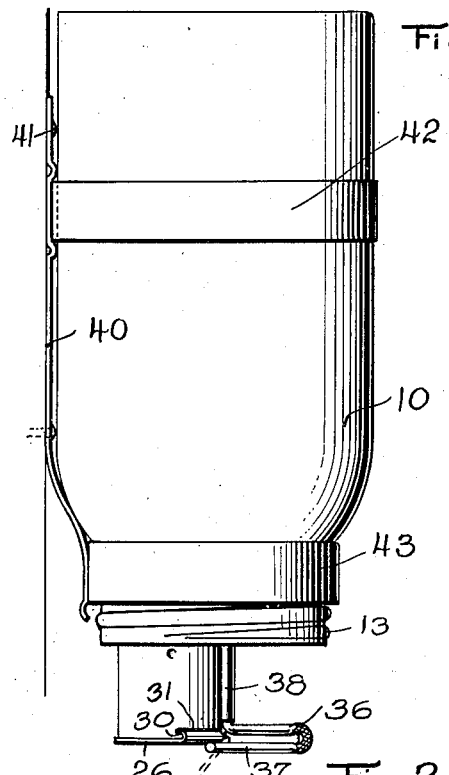
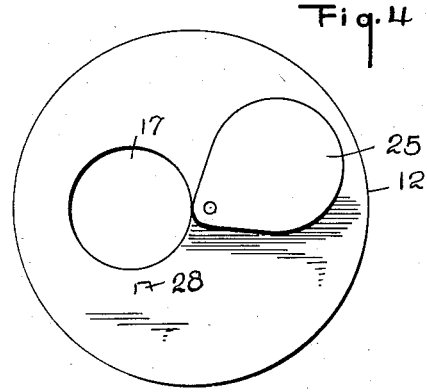
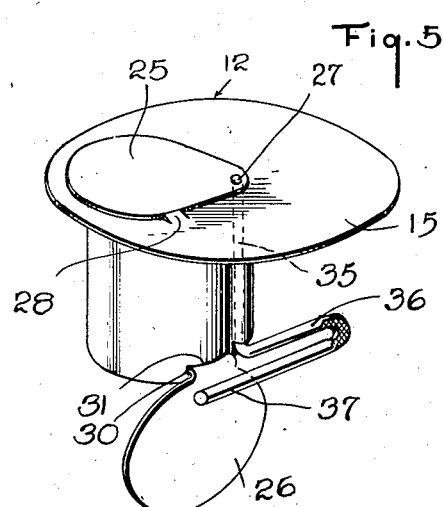
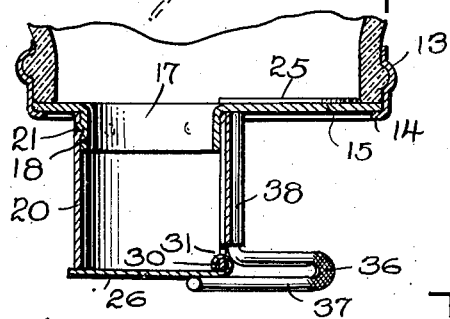
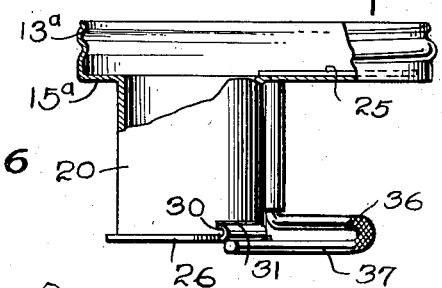
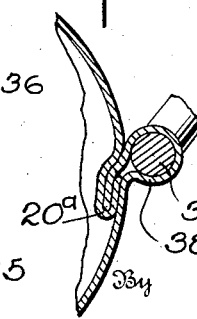
Inventor
Wallace M. Larson Patented Jan. 8, 1946

2,392,676

UNITED STATES PATENT OFFICE 2,392,676

DISPENSING APPLIANCE

Wallace M. Larson, Minneapolis, Minn., assignor to Ammoco Products Co., Inc., St. Paul, Minn., a corporation Application December 11, 1944, Serial No. 567,622

5 Claims. (Cl. 222—446)

This invention relates to dispensing appliances and in its more specific aspects, pertains to appliances for dispensing a predetermined bulk of granular material such as coffee, sugar, and the like, although it will be understood that the invention is not limited in this respect.

Among the objects of this invention may be noted the provision of an improved dispensing appliance, as aforesaid, which is characterized by simplicity and ruggedness in construction. The device may be inexpensively manufactured, and is easily operated. It is well adapted to fulfill the service requirements of such an appliance. The invention provides an improved measuring and dispensing head which may be readily incorporated with a container such as a jar for certain granular materials and which normally acts as a closure for the container. The invention contemplates the provision of an appliance of the last above character which functions to measure from the material in the container a· predetermined quantity thereof, and to maintain such measured quantity available for dispensing.

Other objects will be in part obvious and in part hereinafter pointed out in connection with the following analysis of this invention, wherein is illustrated one of the various possible embodiments of the present invention, together with certain modifications in detail.

In the drawing where similar parts are designated by similar reference characters:

Fig. 1 is an elevation of my improved dispensing appliance associated with a container, the container being mounted in inverted position from any suitable support;

Fig. 2 is a vertical section through the dispensing appliance illustrated at the bottom of Fig. 1;

Fig. 3 is a view of the appliance looking up onto the dispensing valve;

Fig. 4 is a view of the dispensing appliance looking down on the measuring valve;

Fig. 5 is a perspective view of the appliance as aforesaid, illustrating the arrangement of measuring and dispensing valves in relation to the measuring spout;

Fig. 6 is a detail partly in section illustrating the mounting of the valve actuating crank;

Fig. 7 is a view illustrating another embodiment of my invention.

Referring now to the drawing in detail and particularly to the construction illustrated in Figs. 1-6, reference character 10 indicates a container which in the form of the invention illustrated may comprise a glass jar in which certain materials such as coffee, sugar, or the like are stored, although it will be understood that other forms and sizes of containers than the glass jar illustrated may be utilized. Operatively secured to the container 10 is a combined measuring and dispensing head generally indicated at 12, Fig. 5, and adapted to be secured in operative position with respect to the jar mouth by a cap ring 13 (Fig. 2) having a radial flange 14, the ring being adapted to screw on to the jar in the manner of the conventional screw closure caps.

The measuring and dispensing head preferably includes a circular disc 15 of slightly lesser diameter than the diameter of the body of the securing ring 13, the disc being positioned to engage on the jar mouth edge as illustrated in Fig. 2 and being peripherally held by means of the flange 14 of the ring 13. The disc 15 is provided with a circular opening 17 further defined by a cylindrical flange 18, the opening being offset from the center of the disc as illustrated in Fig. 5. Disposed about and concentrically with relation to the cylindrical disc flange 18 is a cylindrical spout 20, which projects a substantial distance above or, when in inverted position as shown, below the plane of the disc 15, the spout 20 being fast on the disc 15 by means of pressed indentations 21 which operate to operatively secure the spout 20 to the cylindrical flange 18 of the disc. As will be more clearly evident as the description proceeds, the spout 20 provides a measuring chamber, ingress of the material to which is controlled by measuring valve 25, turntable on an axis parallel to that of the spout, and egress of the material from the spout being controlled by the dispensing valve 26 operating on an axis transverse to that of the spout. Measuring valve 25 is adapted to control the disc opening 17, the valve being mounted to swing from a center 27 at the approximate center of the disc 15 and in a plane parallel to the plane of the disc 15. A stop lug 28 is pressed from the disc 15 and acts to determine the closed position of measuring valve 25 with respect to the disc opening 17.

The dispensing valve 26 which is cooperated with the outlet side of the spout 20 is provided with a preferably integral hinge portion 30 which forms a bail and which extends through a suitable slot 31 formed in the spout 20 adjacent its outlet edge.

By reference to Fig. 5, the top measuring valve 25 and lower dispensing valve 26 are so related that when the measuring valve is closed, dispensing valve 26 are so related that when the measuring valve is closed, dispensing valve 26 has swung to its open position, and by reference to Fig. 2 when measuring valve 25 is is in its open position dispensing valve 26 is in its closed position. Common mechanism is provided for so operating the valves 25 and 26 that when one valve closes the other opens, such mechanism consisting preferably of a crank operative between said valves and comprising a vertical stem portion 35, a U-shaped handle portion 36, and a camming portion 37. The vertical stem portion 35 of the crank has one end fixed to the top measuring valve 25 whereby oscillatory rotation of said vertical stem 35 causes swinging movement of valve 25 about its pivotal point 27, the stem 35 being journaled in a tubular sleeve 38 formed adjacent to the lapped edges of the spout and exteriorly thereof as illustrated in Fig. 6 and which will be further described hereinafter. The U-shaped handle portion 36 comprises a leg forming an integral extension of the stem and which is bent at right angles thereto, the other leg being reversely bent and extending beyond the axis of stem 35 to form a camming end 37, previously referred to, which cooperates with the dispensing valve 26.

By reference to Fig. 2 the spacing between the legs of the generally U-shaped handle portion is such that the cam end 37 of the crank may extend directly beneath the measuring valve 26 when in closed position and functions to maintain said measuring valve in such closed position. When the camming end 37 of the crank is so positioned, measuring valve 25 is in its relatively open position with respect to the spout ingress opening 17. When the crank has been swung to its position illustrated in Fig. 5, as by suitably manipulating the handle portion 36 of the crank, the camming end 37 swings to a position in which it is spaced from and parallel to the axis of hinge 30 of the dispensing cover, permitting said dispensing cover 26 to open by gravity. Revolution of the stem portion 35 of the crank causes valve 25 to be swung to its closing position with respect to disc opening 17 and thus prevents ingress of material to the spout when the dispensing valve 26 is in its open position, further movement of the valve 25 in its closing direction being positively prevented by stop lug 28, Fig. 5.

By reference to Fig. 6, tubular sleeve 38, in which stem 35 of the crank is journaled, may be formed by extending the material of the spout along its normally overlapped or clinched edge, such extended portion being formed into circular cross-section and thence extending relatively rearwardly for engagement by the reversely bent overlapping edge of the other end of the spout as at 20a. As will be seen, by reference to Fig. 2, tubular sleeve 38 terminates short of the outlet edge of the spout 20 whereby the legs of the handle portion 36 may be so accommodated that camming end 37 of the crank may cooperate with the dispensing cover 26.

In the embodiment of the invention illustrated in Figs. 1-6, said disc 15, spout 20, and parts associated therewith, provide a measuring and dispensing head adapted for association with a jar such as indicated at 10 through the medium of securing ring 13. If desired, a jar of material such as coffee may be sold to the consumer with a measuring and dispensing head as described contained within the container, in addition to the granular material therein, and such is possible without increasing the dimensions of the container by arranging the head in inverted position and in such manner that the spout 20 extends into the neck of the container with securing ring 13 operating to secure the head within the container in the manner described. Upon the package reaching the consumer, securing ring 13 may be unthreaded from the container and the head removed from the container whereupon it may be turned bodily on the jar and secured in the position indicated, for example in Figs. 1 and 2 through the medium of securing ring 13.

Preferably the container and associated measuring and dispensing head may be mounted on a wall as indicated in Fig. 1. Such bracket may comprise a vertically extending strap portion 40 provided with apertures through which screws or nails 41 may extend to secure the strap to a vertical surface such as a wall. The strap portion 40 carries upper and lower rings 42 and 43 respectively, the upper ring being of diameter as to snugly engage the body portion of the jaw with the ring 43 being of lesser diameter to engage with the reduced neck portion of the container. Consequently, the container 10 is maintained in its position illustrated whereby ready access may be had to the operating handle 36 of the valve operating crank mechanism.

Referring to Fig. 7 wherein a modified arrangement is illustrated, the dispensing spout 20 is carried by the closure cap 13a, rather than by a separate disc 15, as in the Figs. 1-5, embodiment of the invention. The arrangement is such that the part 13a and its top horizontal portion 15a is formed in one piece, as distinguished from the two-piece ring and disc 13, 15 of the construction previously described. Otherwise the construction of the embodiment illustrated in Fig. 7 is substantially like that previously described.

In operation of both forms of the invention, the operating crank is turned by manipulation of handle 36 to close the dispensing valve 26, which operation functions to open measuring valve 25. A charge of the material in the container now passes through spout ingress opening 17 into the spout 20, the dimensioning of which is such that a predetermined quantity, such as a tablespoon of the granular material is received by the spout 20 and is there maintained available for dispensing. Upon manipulation of handle 36 of the valve operating crank to a position in which cam end 37 clears dispensing valve 26, as indicated in Fig. 5, the measured charge of material stored in spout 20 is discharged therefrom and simultaneously measuring valve 25 moves to a position in which it interrupts communication between container 10 and spout 20. As the handle 36 is now swung back towards its initial position, its camming end 37 engages the dispensing valve 26 and forces it into its closed position illustrated in Fig. 2 and simultaneously opens measuring valve 26 whereby another measured charge of the material may pass into the spout 20. Such operations may be continued until desired quantities of the material have been withdrawn from the container 10.

The above described appliance is exceedingly inexpensive to manufacture, being characterized by relatively few parts. It is simple in operation and is further rugged and durable in use due to the fact that little or no strain is put on the various moving parts.

As many changes could be made in carrying out the above constructions without departing from the scope of the invention, it is intended that all matter contained in the above description or shown in the accompanying drawing shall be interpreted as illustrative and not in a limiting sense.

I claim:

1. In a dispensing appliance, the combination of a container, a measuring and dispensing head operatively related thereto, said head including a measuring spout, valves respectively controlling ingress of material to the spout from the container and egress of the material from the spout, one of said valves turning on an axis parallel to the axis of the spout and the other of said valves turning on an axis transverse to the axis of said spout, said last named valve being gravity actuated to its open position, a rotatable crank having one end fixed to said first valve whereby to actuate said valve in both directions and having its other end operative to cam said second valve from its open to its closed position.

2. In a dispensing appliance, the combination of a container, a measuring and dispensing head operatively related thereto, said head including a measuring spout, valves respectively controlling ingress of material to the spout from the container and egress of the material from the spout, one of said valves turning on an axis parallel to the axis of the spout and the other of said valves turning on an axis transverse to the axis of said spout, said last named valve being gravity actuated to its open position, a rotatable crank having a vertical stem portion, a handle portion and a camming end, one end of said stem portion being fixed to said first valve, the camming end of said stem portion being operative to cam said second valve from its open to its closed position.

3. In a dispensing appliance, the combination of a container, a measuring and dispensing head operatively related thereto, said head including a measuring spout, valves respectively controlling ingress of material to the spout from the container and egress of the material from the spout, one of said valves turning on an axis parallel to the axis of the spout and the other of said valves turning on an axis transverse to the axis of said spout, said last named valve being gravity actuated to its open position, a rotatable crank including a vertical stem portion, a handle portion and a camming end, means associated with said spout providing a mounting for said stem portion, one end of said stem portion being fixed to the first valve, whereby to actuate said valve in both directions, the camming end being operative to cam said second valve from its open to its closed position.

4. A measuring and dispensing head including a flat element for association with a container for material to be dispensed, said element being provided with an opening therethrough, a spout carried by said element and arranged to receive material passing through said opening, a valve in controlling relation to said opening, said valve turning on an axis parallel to the axis of the spout, a second valve controlling discharge of material from said spout, said valve being hinged to said spout and turning on an axis transverse to the axis of the spout, and a crank arm operatively carried by said spout and having one end fixed to said first valve and its other end disconnected from said second valve but operative to actuate said second valve from open to closed position.

5. A measuring and dispensing head including a flat element for association with a container for material to be measured and dispensed, the element being provided with an opening therethrough, a spout carried by said element and arranged to receive material passing through said opening, said valve being arranged to swing in a plane parallel to the plane of said element, a second valve controlling discharge of material from said spout, said second valve being hinged to said spout and turning on an axis transverse to the axis of the spout, the spout being provided with means forming a mounting for valve actuating means, and valve actuating means including a vertical stem portion carried by said mounting means, a handle portion and a camming end, one end of said portion being fixed to said first valve and operative to actuate said valve in both directions, the camming end being disconnected from said second valve but being operative to actuate said valve from its open to its closed position.

WALLACE M. LARSON.